US005684706A

United States Patent [19]

Harman et al.

[11] Patent Number: 5,684,706

[45] Date of Patent: Nov. 4, 1997

[54] SYSTEM HAVING MULTIPLE USER INPUT STATIONS AND MULTIPLE MAIL PREPARATION APPARATUS FOR PREPARING AND FRANKING A MAIL PIECE

[75] Inventors: James L. Harman, Southport; Flavio M. Manduley, Woodbury, both of Conn.

[73] Assignee: Pitney Bowes Inc., Stamford, Conn.

[21] Appl. No.: 453,301

[22] Filed: May 31, 1995

[51] Int. Cl.[6] .......................... G07B 17/00; G06F 19/00

[52] U.S. Cl. .......................... 364/464.16; 364/464.2; 364/468.01; 364/478.07; 364/478.08

[58] Field of Search .......................... 364/464.02, 464.03, 364/468, 469, 478, 468.01, 478.07, 478.08, 464.11, 464.16, 464.18, 464.2

[56] References Cited

U.S. PATENT DOCUMENTS

| | | | |
|---|---|---|---|
| 4,571,925 | 2/1986 | Adams et al. | 53/502 |
| 4,725,718 | 2/1988 | Sansone et al. | 235/495 |
| 4,800,505 | 1/1989 | Axelrod et al. | 364/478 |
| 5,058,030 | 10/1991 | Schumacher | 364/478.12 |
| 5,067,305 | 11/1991 | Baker et al. | 53/411 |
| 5,200,903 | 4/1993 | Gilham | 364/464.02 |
| 5,224,046 | 6/1993 | Kim et al. | 364/464.02 |
| 5,283,752 | 2/1994 | Gombault et al. | 364/478 |
| 5,490,077 | 2/1996 | Freytag | 364/464.02 |

*Primary Examiner*—Edward R. Cosimano
*Attorney, Agent, or Firm*—Robert H. Whisker; Melvin J. Scolnick

[57] ABSTRACT

A system for producing mail pieces. The system includes a plurality of apparatus each having a first printer for printing documents and a second printer for printing envelopes and a mail finishing unit for receiving the printed documents from the first printer and the envelopes printed with corresponding addresses from the second printer and inserting the documents into the envelope to form and frank a mail piece, and a plurality of user input stations. The apparatus operates under the control of a single stream of job data from a mail center controller, where the job data includes a job header defining default mail piece attributes and mail piece records which include document data and address data, and which may include specific mail piece attribute data for each corresponding mail piece. The apparatus control mechanism partitions the data stream and controls the first printer to print the documents while controlling the second printer to separately print the envelopes which are moved along a separate path to an insert station where the mail piece is formed. The system also includes data stores of postal rates and of per item weights of items of materials used to form mail pieces which are used to calculate postage values for mail pieces.

18 Claims, 10 Drawing Sheets

SYSTEM HAVING MULTIPLE USER INPUT STATIONS AND MULTIPLE MAIL PREPARATION APPARATUS FOR PREPARING AND FRANKING A MAIL PIECE

BACKGROUND OF THE INVENTION

The subject invention relates to a system for producing and franking a mail piece. More particularly, it relates to a system for producing mail pieces which system is suitable for multiple users of microcomputers and standard word processing software in an office environment.

Many systems for directly producing mail pieces directly from the printed output of a data processing system have been proposed in the past. For example, U.S. Pat. No. 5,283,752; to Gombault et al.; issued Feb. 1st. 1994 discloses a mail preparation system wherein a data processing system controls a linear mail preparation apparatus. The data processing system controls a printer to print documents which, after printing, pass, under the control of the data processing system, through a succession of stations such as a burster, an insert feed station, an address printer, a postage meter and the like.

Similarly, U.S. Pat. No. 4,800,505; to: Axelrod et al.; issued Jan. 24, 1989, discloses a system wherein a data processing system prints documents and marks them with an identification code, and simultaneously downloads parameters for controlling the operation of a mail preparation line to a database. As the documents are fed into the mail preparation line, the identification code is scanned and used to access the database to determine the parameters for each mail piece to be produced from the corresponding documents.

Other systems for inserting documents into windowed envelopes so that an address printed on the document is visible, or systems for printing self-mailer forms which are then folded and sealed to form mail pieces are also known.

A system where an envelope form is printed in sequence with documents and later accumulated with the documents, then wrapped around the documents and sealed to form the mail piece is described in U.S. Pat. No.: 5,067,305; issued Nov. 26, 1991; to Baker et al.

U.S. Pat. No. 4,797,830; to: Baggarly et al. describes an inserter et al. system which has a capability to compute postage for a mail piece based upon predetermined weights for inserts included in the mail piece.

While such systems are perhaps suitable for their intended purpose heretofore no system has been available to users who wish to produce a number of mailings of moderate size and who wish to produce high quality mail runs. Systems such as that taught by Gombault et al., Baggarly et al. and Axelrod et al. are intended for large scale mailings produced by main frame computers and high capacity inserter systems, while windowed envelopes and self-mailers have an unfortunate "junk mail" aspect.

Accordingly, it is an object of the subject invention to provide a system for producing and franking moderately sized mail runs of a high quality, and which is suitable for use in an office environment with standard microcomputers and word processing programs.

BRIEF SUMMARY OF THE INVENTION

The above object is achieved and the disadvantages of the prior art are overcome in accordance with the subject invention by means of a system including a plurality of apparatus for producing a mail piece, wherein the apparatus each include a first printer for printing a document and a mail finishing unit for receiving the document from the first printer and combining the document with an envelope to form a mail piece. The mail finishing unit includes a mechanism for franking the mail piece. The apparatus also includes a controller which is responsive to mail piece data; the mail piece data including first data for defining the document and second data for defining the address to be printed on the document and postal data defining a postage value for the mail piece. The controller controls the first printer to print documents in accordance with the document data and controls the franking mechanism to frank the mail piece with the postage value.

The system also includes a mail center controller for receiving mail piece data, selecting one of the apparatus in accordance with the mail piece data and outputting a digital signal representative of the mail piece data to the selected apparatus.

The mail center controller includes a data base of postage rates and is responsive to the mail piece data to calculate a postage value for the mail piece and to append the value to the digital signal prior to outputting the signal.

Preferably, the mail center controller also includes a capability to access a second data base of per item weights (or other characteristic upon which postal rates may be based) to calculate a weight for the mail piece if the weight is not included in the mail piece data.

In accordance with one aspect of the subject invention the mail center controller determines costs and charges the costs to an account selected in accordance with the mail piece data.

The system of the subject invention also includes data processing apparatus for:

- generating document data descriptive of a document in the mail piece;
- appending attribute data to the document data to form mail piece data descriptive of the mail piece; and,
- transmitting a digital signal representative of the mail piece data to the apparatus.

In accordance with another aspect of the subject invention the apparatus includes a second printer which both prints an address on the mail piece envelope and prints a franking indicia on the envelope.

In accordance with yet another aspect of the subject invention the mail piece is printed with a scannable representation of the postage amount. (By scannable representation herein is meant a representation such as a bar code which can easily be automatically scanned so that postage amounts can be determined off-line.)

In another embodiment of the subject invention the mail production apparatus has a capability to determine postage values directly from the mail piece data. In this embodiment the apparatus returns costs, including postage costs to the mail center controller for allocation to a selected account.

Other advantages and objects of the invention will be apparent to those skilled in the art from consideration of the attached drawings and of the detailed description set forth below.

BRIEF DESCRIPTION OF THE DRAWINGS

Various preferred embodiments of the subject invention are shown in the attached drawings wherein similar elements are numbered the same.

DETAILED DESCRIPTION OF THE PREFERRED EMBODIMENTS OF THE SUBJECT INVENTION

Figure 1:
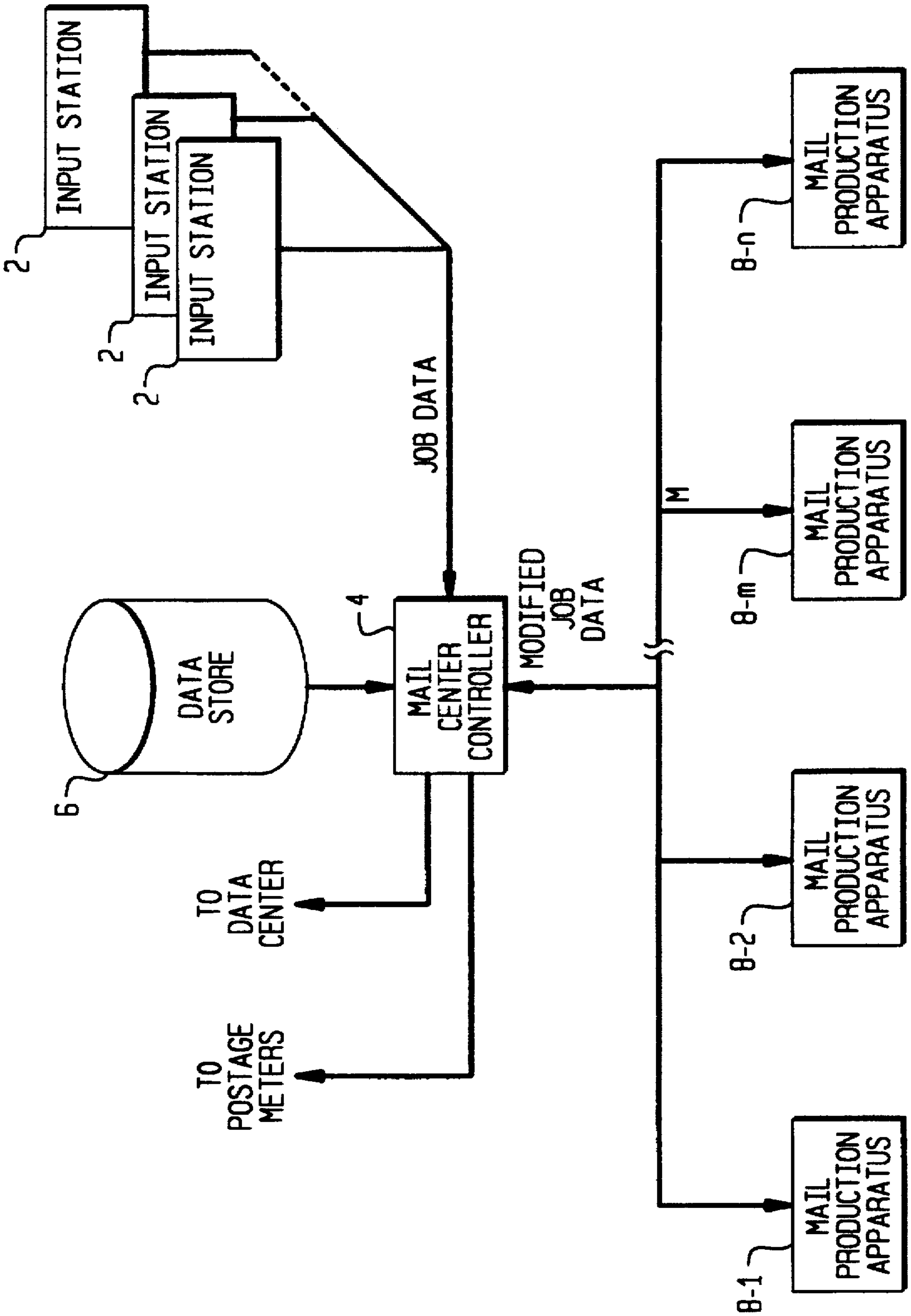
FIG. 1 is a schematic block diagram of a system in accordance with the subject invention.

FIG. 1 shows a system in accordance with the subject invention which includes a plurality of user input stations 2 which communicate with mail center controller 4. Stations 2 typically include a conventional microcomputer running a substantially conventional word processing application, as will be further described below. Mail center controller 4 receives job data 10 from stations 2 and, in accordance with a preferred embodiment of the subject invention, modifies the data to include postage values for mail pieces to be prepared by the system. Data store 6 stores postal rate information and per item weights for materials used in the mail pieces for use determining postage values for mail pieces. Job data 10 is then output to an available one of mail preparation apparatus 8 for production and franking of corresponding mail pieces.

In another embodiment of the subject invention, postage values for the mail pieces are determined by mail preparation apparatus as described in commonly-assigned, co-pending U.S. application Ser. No., 08/453,317, for: System for Preparing and Franking a Mail Piece, filed on even date herewith; now allowed, which is hereby incorporated by reference.(atty. doc. E-365)

In a preferred embodiment of the subject invention, mail center controller 4 allocates mailing costs, including postage costs, to designated accounts.

In another preferred embodiment, mail center controller 4 communicates with a data center such as a data center operated under the service mark "Postage-by-Phone" by the assignee of the present application, to recharge postage meters used with mail preparation apparatus 8.

Figure 2:
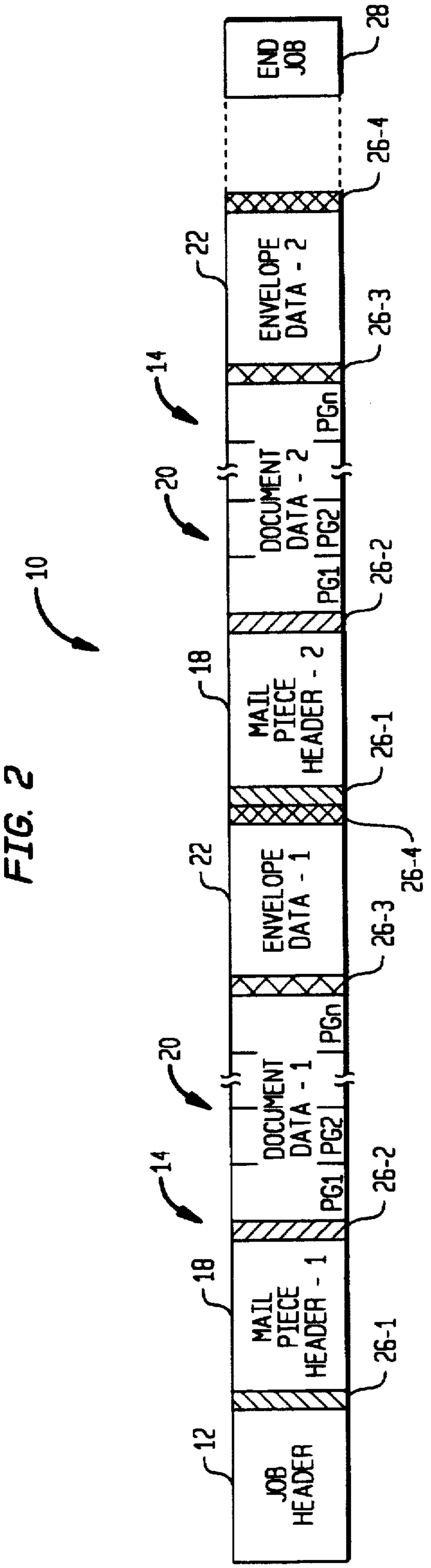
FIG. 2 is a schematic representation of job data defining a mailing job.

In FIG. 2 a schematic representation of job data 10 for controlling an apparatus in accordance with the subject invention to produce a mailing job, i.e. a sequence of mail pieces, is shown. Job data 10 includes job header 12 and a sequence of mail piece records 14, each of records 14 including mail piece data corresponding to a mail piece to be produced in the job. Job header 12 includes mail piece data defining default attributes for each mail piece in the job; including the number of document sheets to be accumulated for each mail piece, whether or not a pre-printed insert is to be added to the document sheets, the manner in which the accumulated sheets are to be folded, whether or not a BRE (i.e. business return envelope) is to be inserted into the envelope with the folded accumulation, and whether or not the mail piece is to be moistened and sealed.

Preferably job header 12 also defines a job type: whether or not envelope data is present (i.e. if a window envelope is to be used), whether all mail pieces include a uniform number of document sheets, and whether or not inserts vary among the mail pieces; as well as an optional job name to be displayed while the job runs. Job type data allows the system to anticipate simpler jobs (e.g. there is no need to execute code associated with envelope printing if the job type defines a window envelope) and confirms that the absence of unneeded attribute data is not an error. Preferably the job type also defines whether or not the mail piece is to be franked, and whether postage values are to be calculated or have been determined a priori.

Each of records 14 corresponds to one mail piece to be produced, and includes mail piece header 18, document data field 20, and envelope data field 22. Mail piece header 18 includes the same (or a subset of the) mail piece data elements included in job header 12 to define the mail piece attributes specific to the corresponding mail piece.

Document data 20 is mail piece data defining a sequence of document pages to be printed by the document printer as will be described below. It is a particular advantage of the subject invention that document data 20 can be completely compatible with standard laser printers and the output of standard word processing programs and described in a conventional page description language such as the Hewlett Packard PCL5 language, or equivalent. Envelope data field 22 includes an address to be printed on the envelope. Preferably this address will be extracted from document data by the host computer in any convenient manner such as the identification of address fields in the document data, as will be described further below.

Fields 18, 20 and 22 are separated by unique separators 26-1, 26-2, 26-3 and 26-4 and data 10 also includes an End of Job marker 28 to identify the end of the job.

Figure 3:
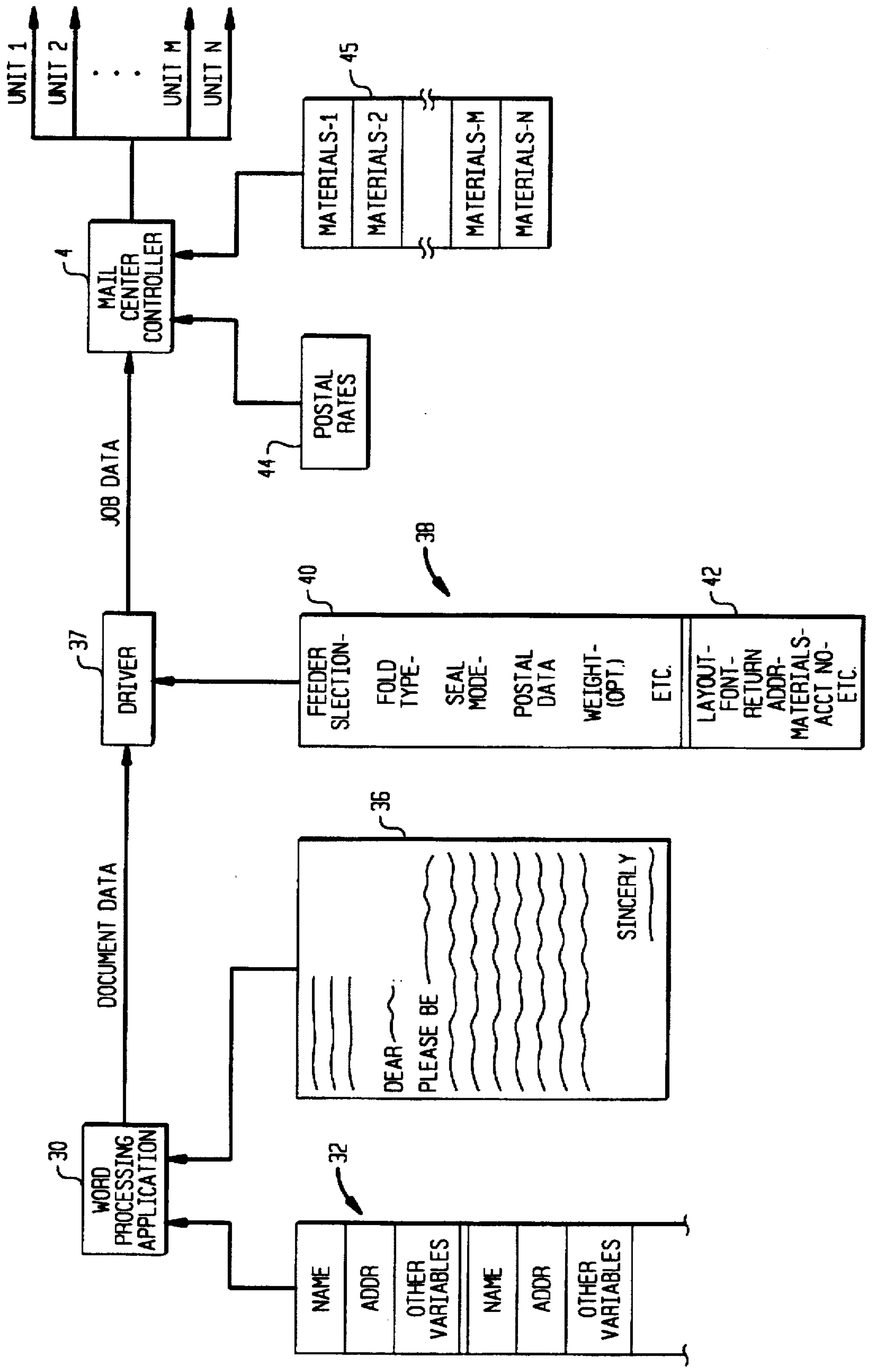
FIG. 3 is a schematic representation of the data flow in a host computer and a mail center controller in producing the job data and modified job data of FIG. 1.

FIG. 3 shows the data flow in input station 2 and mail center controller 4 in creating job data 10. Input station 2 is preferably a microcomputer of the type commonly used in an office environment, A commercial word processing application 30, such as that sold under the trade name "Word" by the Microsoft Corporation, executes a conventional merge application to merge variable data 32, which includes name, address and other variables to be printed on the documents with a previously input form 36 to create document data. The document data is input to driver 37 and driver 37 creates the job data by extracting an address from the document data and accessing data store 38 to define the mail piece attributes, previously defined by the system operator.

Driver 37 extracts the address from the document data in any convenient conventional manner, such as by the use of a predetermined field within the document data, or the use of an algorithm based upon the detection of alphanumeric combinations typical of zip codes, state names, city names, etc., as is also known. Driver 37 also accesses data store 38 to obtain the attribute information which includes processing attributes 40, such as feeder selection, fold type, sealing mode etc., which control operation of apparatus 8 to produce the mail piece in the desired form, as will be described further below. Data store 38 also includes postal attributes for the mail piece; such as the class of postal service to be used, any applicable discounts, or any special services (e.g. special delivery) required.

Postal attributes also include a field for a postage value for each mail piece. If postage values are known this field can be determined a priori; however, in accordance with a preferred embodiment of the subject invention, postage values are determined by mail center controller 4, as will be described below.

Data store 38 can also include the mail piece weight if it is known.

Preferably driver 37 also gets job type data 42 from data store 38 for inclusion in job header 12. Driver 37 then adds separators 26-1 through 26-4 to create header 12 and records 14, as described above. It is well within the skill of a person of ordinary skill in the programming arts to modify a word processing application or produce a special application which would enable a system to provide such varying attribute data for mail piece headers 18, and details of such applications need not be described for an understanding of the subject invention.

Job data 10 is then transmitted to mail center controller 6. If the mail pieces are to be franked and the postage values have not been determined a priori, mail center controller 6 accesses postal rate data base 44 and material data base 45 to determine the postage and materials costs as a function of the materials used. Note that materials data base 45 also includes the present status of materials in each unit of apparatus 8: 8-1, 8-2, . . . 8-m, 8-n, to enable controller 6 to properly assign jobs. Mail center controller 6 then appends postage values for each mail piece in the appropriate field in header 18 and outputs job data 10 to a selected unit of apparatus 8, as will be described further below.

Figure 4:
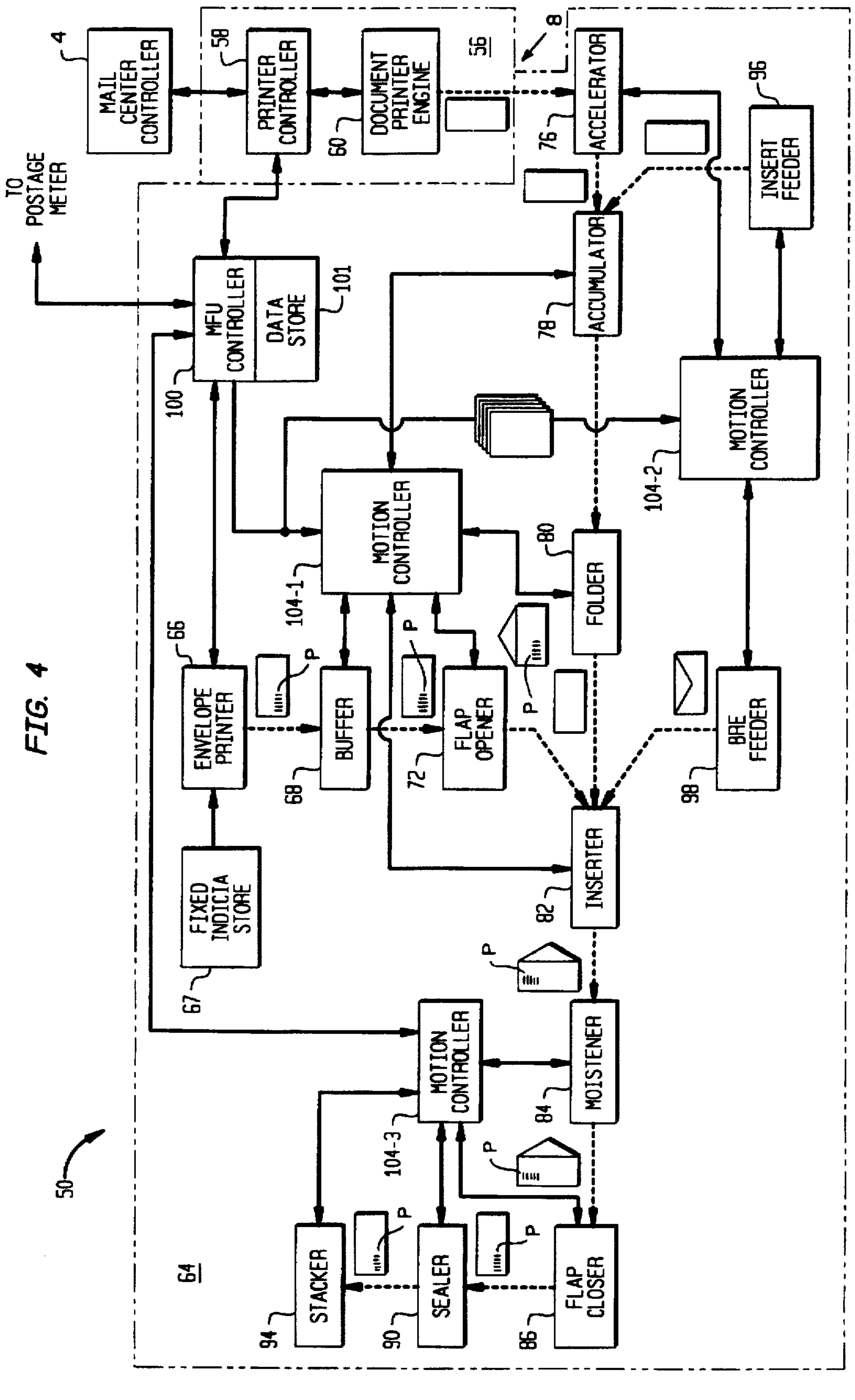
FIG. 4 is a schematic block diagram of the flow of mail production apparatus used in one embodiment of the system of FIG. 1.

Turning to FIG. 4, apparatus 8 is connected to mail center controller 4 to receive job data 10, which preferably is modified to include postage values for each mail piece, as an electronic digital signal which is generated as described above. Apparatus 8 includes document printer 56, which is preferably a laser printer including printer controller 58 and a conventional document printer engine 60, which is preferably a Canon model LBP-NX, and a mail finishing unit 64 which receives the printed documents from printer engine 60 and inserts them into envelopes to form mail pieces in accordance with the mail piece data, as will be described below.

Printer controller 58 receives job data 10 from mail center controller 4 and parses the data; sending the attribute data from either job header 12 or mail piece header 18 to mail finishing unit controller 100, and sending document data 20 to document printer engine 60, as will be described further below. Mail finishing unit controller 100 stores mail piece attributes 40 from job header 12 for default control of the production of each mail piece and downloads common elements of the address to be printed on the envelopes to envelope printer 66. Preferably envelope printer 66 includes an integral controller which will render the text characters received from mail finishing unit controller 100 into appropriate control signals to render an image of the address in accordance with the address data, the font, the layout etc.

Envelope printer 66 also stores the fixed portion of postal indicia to be printed on the envelope when the mail piece is to be franked in data store 67.

In one embodiment of the subject invention, where apparatus 8 have a capability to independently determine postage values for mail pieces, when a mail piece is to be franked finishing unit controller 100 accesses per item weight data base 117 and postal rate data base 119 (shown in FIG. 5) in data store 101 to determine the weight of the mail piece and determine the appropriate postage value for the mail piece in a manner described more fully in U.S. patent application Ser. No. 08/453,317 now, allowed (atty. doc. E-365), referenced above. Apparatus 8 then returns postage costs (and, optionally, material usage) to mail center controller 8 for allocation of costs to user accounts.

In another embodiment of the subject invention, when the mail piece is to be franked and the postage value has not been determined a priori, mail center controller 4 calculates postage and material costs in accordance with the mail piece data and appends a postage value to mail piece header 18.

Once the postage value is determined, controller 100 then requests a postal indicia corresponding to that value from a class 2 meter (not shown) which, assuming the request is granted, returns the variable portion of the indicia to controller 100. (The meter, of course, accounts for the postage expended in a conventional manner.) Controller 100 downloads this variable data to printer 66 together with address and other information to be printed on the envelope. Printer 66 then renders the full image to be printed on the envelope, combining the fixed portion of the indicia stored in data store 67 with the variable portion received from controller 100 to frank the mail piece.

(Class 2 meters are postage meters which dispense and account for pre-paid postage as do traditional postage meters but which use non-secure printers such as ink jet printers to print indicia. Where traditional, class 1, meters use rotary or flatbed print heads to print indicia which include complex, arbitrary images and special inks to protect against counterfeiting of indicia, class 2 meters incorporate encrypted information in the indicia to protect against counterfeiting while allowing use of non-secure printers, such as printer 66. Such meters are known in the art and a further description of their operation is not necessary for an understanding of the subject invention. Pre-storage of fixed portions of indicia, as in the preferred embodiment described above, is described, for example, in published European patent application no. 0,578,042A2, to: Stephen Gunther, filed Jun. 21, 1993.)

Alternatively the postage amount may be down loaded to printer 66 for printing as a scannable representation P such as a bar code so that the mail piece can later be scanned and franked off line.

Envelope printer 66 is also preferably an ink jet printer and the printed envelopes are output from printer 66 to a drying buffer station 68 which extends the transport time of a succession of envelopes as they are output by envelope printer 66 to allow the printed address time to dry. Since a number of envelopes, preferably up to 6, are stored in buffer 68 printer controller 58 does not forward documents for printing to printer engine 60 until buffer 68 is loaded. That is, until drying buffer 68 is either filled to capacity or until an End of Job (EOJ) code is detected and the system knows that the last envelope is in buffer 68.

After the printed address has dried on the envelope the envelope proceeds to flap opener station 72 where the envelope flap is opened prior to insertion of the documents and possibly other items.

When drying buffer 68 is loaded printer controller 58 outputs a page of document data to document printer engine 60 which prints that page in a conventional manner. As the page is printed it is received by accelerator station 76, and as printer engine 60 releases the printed page accelerator station 76 accelerates the page to the faster speed at which mail finishing unit 64 operates.

Accelerator station 76 then transfers the printed page to accumulator station 78 and, if a plurality of pages are to be included in the mail piece the above described operations are repeated until all the document pages are in accumulator station 78. If the mail piece attributes specified for the mail piece include a preprinted insert such a preprinted insert may be fed from insert feeder 96 to accumulator station 78 since the higher operating speed of a mail finishing unit 64 will allow time for this without slowing the operation of document printer engine 60.

Once completed the accumulation of printed document pages and any preprinted inserts are transferred from accumulator station 78 to folder station 80 where the accumulation is folded into either a "C" or "Z" fold as specified in the mail piece attributes. Once the folded accumulation is present at folder station 80 the envelope, with its flap open, is fed (or has been fed) to inserter station 82 and the folded accumulation is transferred from folder station 80 to inserter station 82 for insertion into the envelope. If specified by the mail piece attributes a BRE is fed from BRE feeder 98 and also inserted into the envelope.

The mail piece (i.e. the envelope with all printed documents and any preprinted inserts and BRE's inserted) is fed from inserter station 82 to moistener station 84 where the envelope flap is moistened if the mail piece is to be sealed. The mail piece then proceeds to flap closer station 86, sealer 90 and output stacker 94 where the completed mail piece, including all preprinted inserts and BRE's, with an address and possible return address printed on a conventional envelope, and which has been sealed if so specified, is output for delivery to the postal service.

The various stations described in mail finishing unit 64 perform functions which are well known in the mail preparation art and implementation of such stations would be well within the skill of those of ordinary skill in the mail preparation arts.

In a preferred embodiment of the subject invention drying buffer 68 is formed as an arrangement of four helical screws arranged to support an envelope and transport the envelope as the screws rotate, as described in commonly assigned, co-pending U.S. patent application Ser. No. 08/236,813, filed May 2, 1994, now U.S. Pat. No. 5,429,349, which is hereby incorporated by reference.

Figure 5:
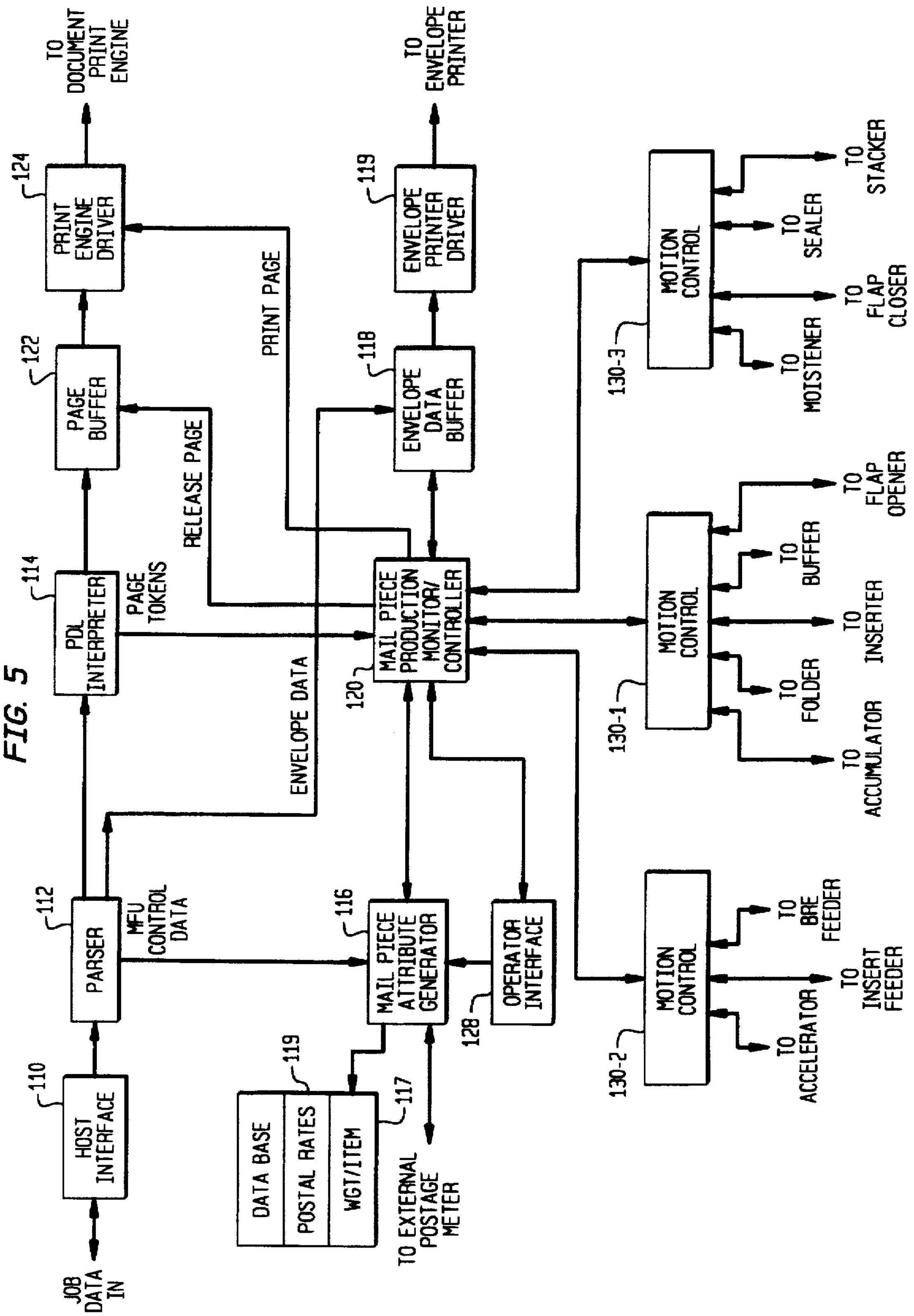
FIG. 5 is a schematic representation of the flow of control data in the apparatus FIG. 4.

Turning to FIG. 5 the operation of apparatus 8 is controlled in accordance with job data 10 by the execution of various software modules resident in printer controller 58, mail finishing unit controller 100, and motion controllers 104-1, 104-2 and 104-3. It should be noted that the partitioning of these modules among the various controllers forms no part of the subject invention as claimed and that, in principle, all the functions of apparatus 8 could be controlled by a single controller of sufficient capacity.

Job data 10 is input from mail center controller 4 to host interface 110, which is resident in printer controller 58. Interface 110 is preferably a standard interface for managing a serial protocol such as the RS 232 protocol, or a standard parallel or network protocol. Job data 10 is then transferred to parser 112 which outputs document data from field 20 to page description language (PDL) interpreter 114 and envelope data from field 22 to envelope data buffer 118 in mail finishing unit controller 100. Parser 112 also outputs mail finishing unit control data, which is default attribute data from job header 12 or specific mail piece attribute data from mail piece header 18, and the EOJ to mail piece attribute generator 116.

Mail piece attribute generator 116 receives the mail finishing unit control data which is expressed as codes descriptive of a mail piece; (e.g. codes which would describe a mail piece having 1 printed page, a preprinted insert, no BRE, which is to be sealed) and converts these descriptive codes into commands for the operation of the various stations and printers in mail finishing unit 64. Default commands are stored permanently for the duration of a job while commands found in mail piece header 18 are stored only for the production of a corresponding mail piece. Preferably common information for printing the envelopes is transferred to the integral controller of envelope printer 66. Mail piece attribute generator 116 also responds to the EOJ code to identify the last mail piece to assure that the mailing job is properly terminated and the last mail piece completed.

Returning to interpreter 114, the document data, which is expressed in a conventional page description language such as PCL5 is interpreted at 114 in a conventional manner into an appropriate set of printer commands to drive the print engine used. As each page is translated it is stored in page buffer 122. Such interpretation and buffering of document pages is conventional in the laser printing art and need not be described further here for an understanding of the subject invention except to note that buffer 122 is substantially larger than is normally found in a commercial laser printer for office use since it is desirable that pages be stored until a mail piece is output from apparatus 8 to facilitate recovery from jam conditions.

Once the first envelope is available data is transferred from page buffer 122 to print engine driver 124 which renders the print commands into appropriate control signals to generate an image of the page at document printer engine 60.

Also as each page is interpreted interpreter 114 transmits a page token to mail piece production monitor/controller 120 which is resident in mail finishing unit controller 100. Monitor/controller 120 updates these tokens as pages move through mail finishing unit 64 to track the pages and to facilitate recovery from jam conditions.

When monitor/controller 120 detects the presence of envelope data in buffer 118 it transfers the envelope data to envelope print driver 119 which controls envelope printer 66 to print the envelope data on the envelope in accordance with the previously determined attribute data defining the common elements of the envelope address and, for mail pieces to be franked, the variable portions of the indicia which have been determined by attribute generator 116 as will be described more fully below. It should be noted that, since envelope printer 66 includes an integral controller, driver 119 is substantially simpler than driver 124. And, as with print engine driver 124, the control of envelope printer 66, which is preferably an ink jet printer, is conventional and need not be described further here for an understanding of the subject invention except to note that buffer 118 is also somewhat larger than normal so that envelope data may also be recovered in the case of a Mail piece production monitor/controller 120 will then continue to print envelope data from buffer 118 as it is available until drying buffer 68 is loaded; that is until buffer 68 is completely full or an EOJ code is detected and monitor/controller 120 recognizes that the last envelope is in drying buffer 68. Then, when drying buffer 68 is loaded monitor/controller 120 signals page buffer 122 to release the next page to engine driver 124, and when document printer engine 60 is ready signals driver 124 to print the page. If multiple pages of documents are to be included in a mail piece, as defined by the mail piece attributes generated at 116, monitor/controller 120 continues to release pages from buffer 122 until all pages for a mail piece are printed.

Once monitor/controller 120 has released the last page for a mail piece it determines if the EOJ code has been detected and the last envelope is in drying buffer 68. If not the next envelope data in buffer 118 is printed and drying buffer 68 is advanced and pages for the next document are released from buffer 122, as described above. Once the EOJ code is detected and monitor/controller 120 recognizes that the last envelope has been printed and is in drying buffer 68 monitor controller 120 will cease printing envelopes but will continue to release pages from page buffer 122 until the last envelope is fed from drying buffer 68 to inserter station 82 so that the last mail piece in a mailing job is properly processed through mail finishing unit 64.

As pages are released from document printer engine 60 they are processed through mail finishing unit 64 as described above. Monitor/controller 120 accesses the mail piece attributes generated at 116 and issues appropriate commands to motion controllers 104-1, 104-2 and 104-3 to control the various stations appropriately to produce mail pieces having the desired attribute. These commands are received by motion control software 130-1, 130-2 and 130-3, which are resident in corresponding motion controllers while 104-1, 104-2 and 104-3 and which generate appropriate control signals for various motors and actuators in mail finishing unit 64 and which monitor various sensors in unit 64 to produce a mail pieces having the desired attributes. Detailed design of the motion controllers and associated software will depend in general on the detailed design of the various stations of mail finishing unit 64 but is well within the skill of a person of ordinary skill in the digital control arts as they are applied to the mail processing art. A particularly suitable form of motion controller wherein identical motion control software can be adapted to various stations by downloading of appropriate data is described in commonly assigned, co pending U.S. patent application 08/327,246; filed Sep. 29, 1994, now allowed which is hereby incorporated by reference.

In the preferred embodiment shown, motion control software 130-1 controls accumulator station 78, folder station 80, inserter station 82, drying buffer 68 and flap opener 72; motion control software 130-2 controls accelerator 76, insert feeder 96 and BRE feeder 98; and motion control software 130-3 controls moistener 84, flap closer 86, sealer station 90 and stacker 94. In general this partitioning of control functions is chosen to simplify wiring of mail finishing unit 64 and to minimize the need for time critical transfers of information between controllers, and forms no part of the subject invention as claimed.

As has been noted, if a mail piece is to be franked, the postage value to be used can be determined in three ways: a priori definition, as for multiple runs of identical jobs where the postage values are known; calculation by a mail processing apparatus where the apparatus has a capability to directly determine postage values, as described in above referenced U.S. patent application Ser. No. 08/453,317, now allowed (E-365); and modification of job data 10 by mail center controller 6. FIGS. 6*a*, 6*b*, 6*c* and 6*d* show a flow diagram of the operation of mail center controller 6 in receiving job data, modifying the data as necessary to include postage values, allocating costs, and assigning a job to a mail processing apparatus.

At 150 mail center controller 4 receives job data 10 from one of input stations 2. At 152 controller 4 determines the material requirements for the job, and at 154 tests to determine if a capable mail processing apparatus is on-line. That is, for example, if the job requires non-standard size materials controller 4 determines if at least one mail processing apparatus 8 capable of processing such material is on-line. If no capable apparatus is found controller 4 goes to an error routine.

If a capable unit is found then at 156 controller 6 calculates costs (as will be further described below) and preferably determines an account to be charged from job header 12. At 160 controller 4 tests the selected account to determine if it is a valid account with sufficient funds to cover the costs. If not controller 6 goes to an error routine.

If funds are available, then at 162 controller identifies the next capable one of mail processing apparatus 8 which will be available and at 164 tests to determine if any capable unit will be available. If not controller 4 goes to an error routine. (Because of the test at 154 at least one capable unit must be on-line.)

Then if a capable unit of apparatus 8 will be available, at 168 controller 4 tests to determine if the postage meter (not shown) associated with the next available apparatus 8 has sufficient funds for postage for the job. Assuming the meter has sufficient funds, then at 170 controller 6 tests to determine if the correct materials have been loaded into the selected unit of apparatus 8. Assuming that the materials are correctly loaded, the at 172 controller 4 waits until the selected unit is ready; i.e. until any previous job is completed and all necessary materials are loaded.

Figure 6A:
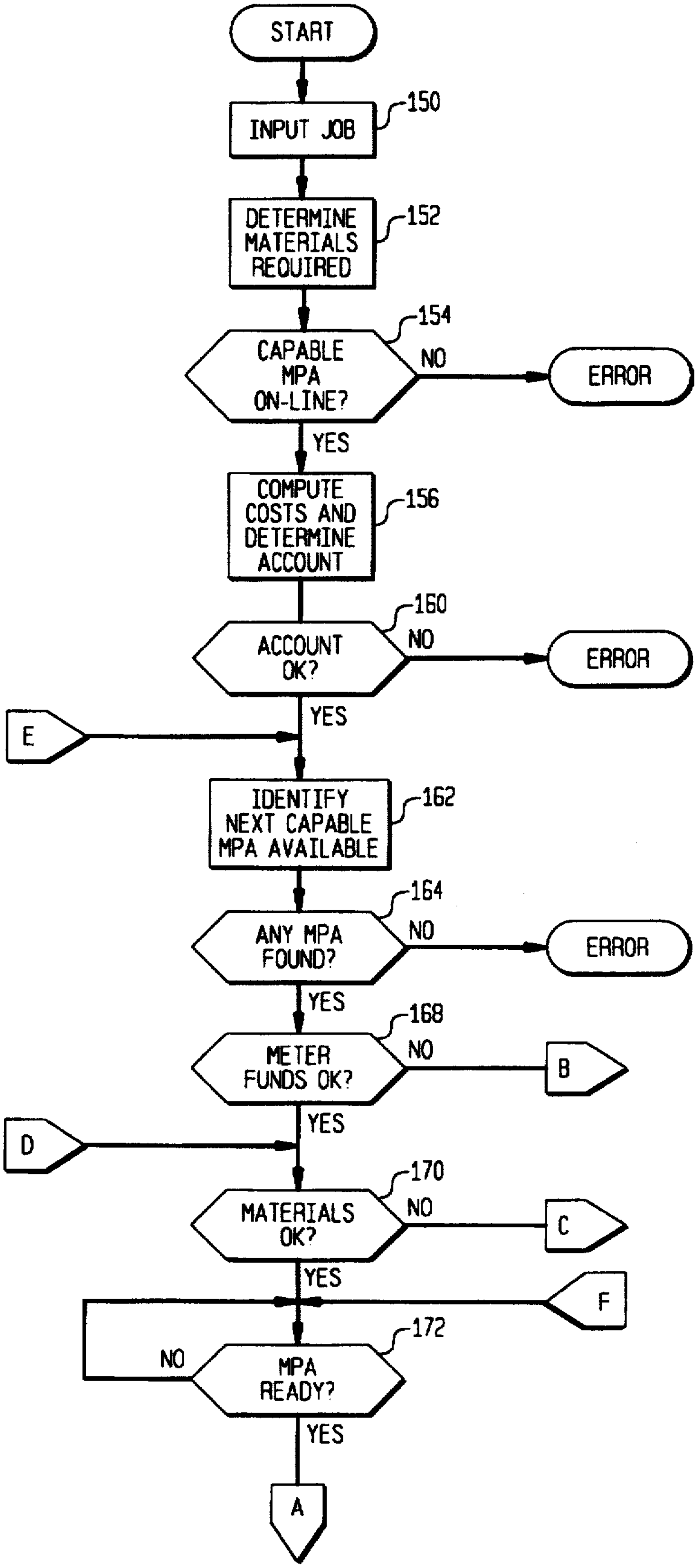
FIGS. 6*a*, 6*b*, 6*c*, and 6*d* are a flow diagram of the operation of the mail center controller of FIG. 1.
Figure 6B:
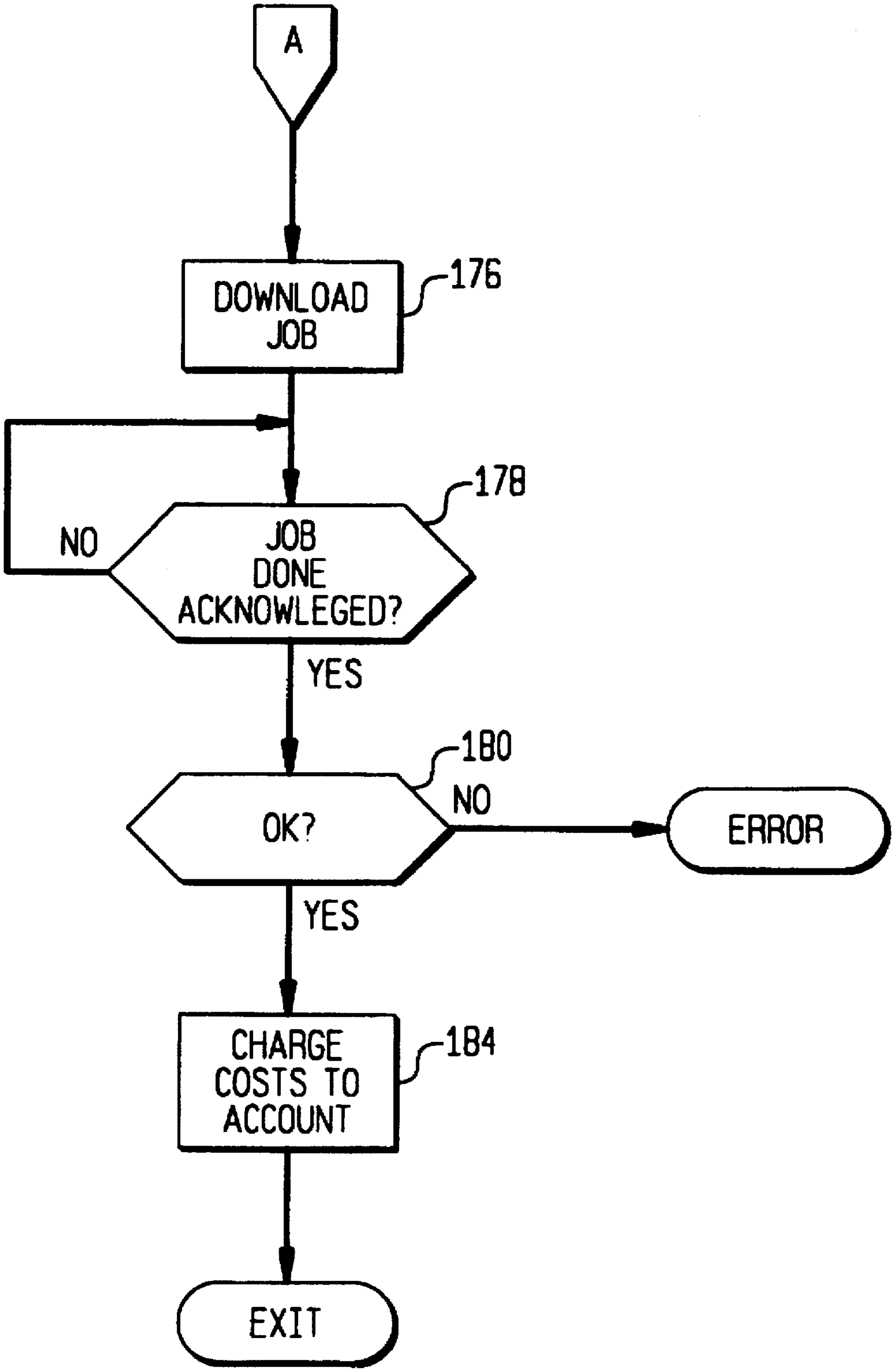

Turning to FIG. 6*b*, once the selected unit of apparatus 8 is ready, controller 4 downloads job data 10 at 176 and loops until acknowledgment that the job is done is received at 178.

(In embodiments where postage values are calculated by the selected unit of apparatus 8 the unit preferably returns the value of postage expended with the job done acknowledgment.)

When acknowledgment is received at 178, then at 180 mail center controller 4 confirms that the job has been successfully completed. If not controller 4 goes to an error routine. When the job is successfully completed then at 184 controller 6 charges the selected account and exits.

Figure 6C:
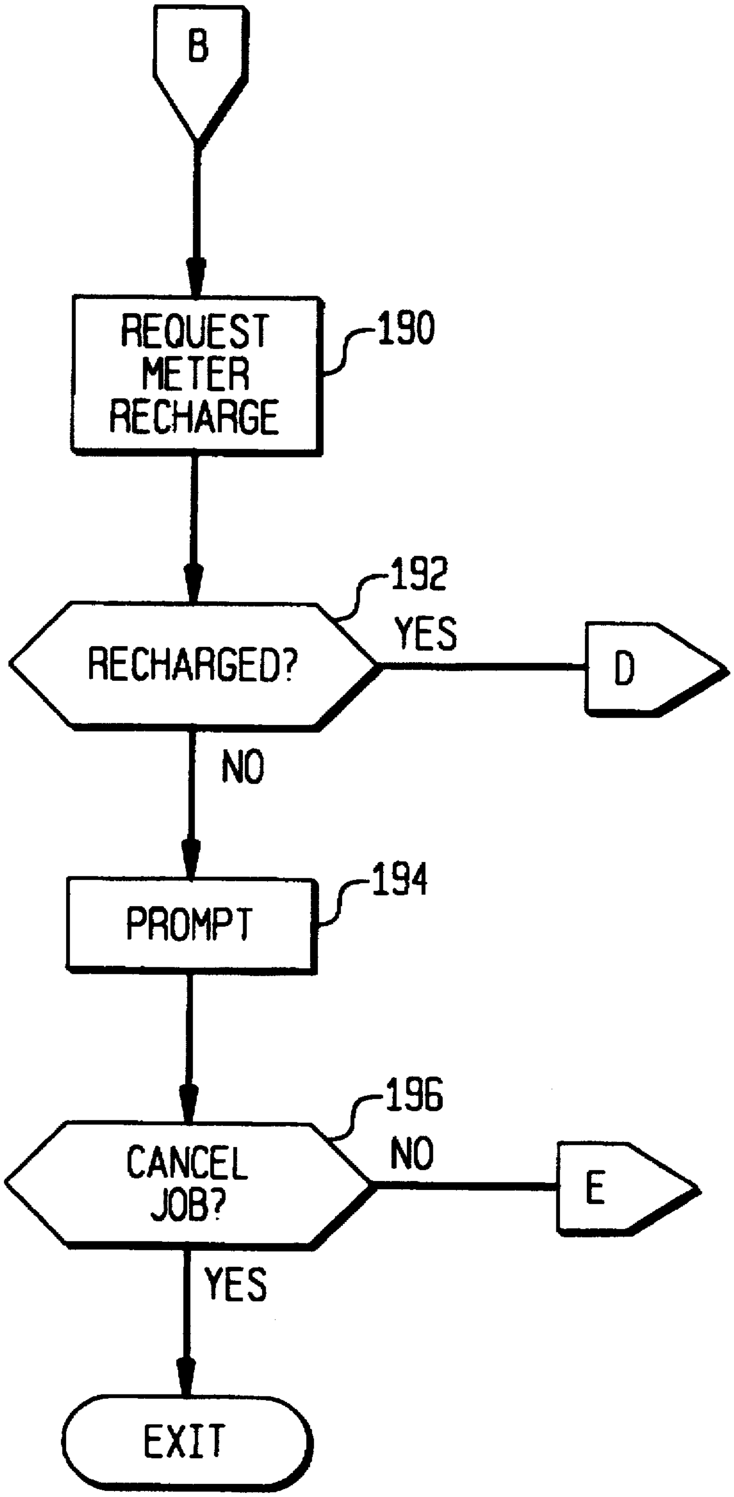

Returning to 168 in FIG. 6*a*, if the meter lacks sufficient funds controller 4 goes to B in FIG. 6*c*. There at 190 controller 4 requests a meter recharge to provide the necessary funds. As noted above, preferably controller 6 directly contacts a data center but recharge of the meter may be requested in any convenient manner, as by a prompt to an operator. A system for automatic recharging of postage meters is described in U.S. Pat. No. 5,224,046; to: Kim et al.; issued: Jun. 29, 1993, which is hereby incorporated by reference.

Then at 192 controller 4 tests to determine if the meter recharge has been completed. If so controller 4 returns to D at 170 in FIG. 6*a*. If not then at 194 controller 4 prompts the operator to determine if the job is to be canceled, and at 196 returns to E at 162 in FIG. 6*a* to test the next available unit of apparatus 8 if the job is not canceled and otherwise exits to an appropriate cancellation routine.

Figure 6D:
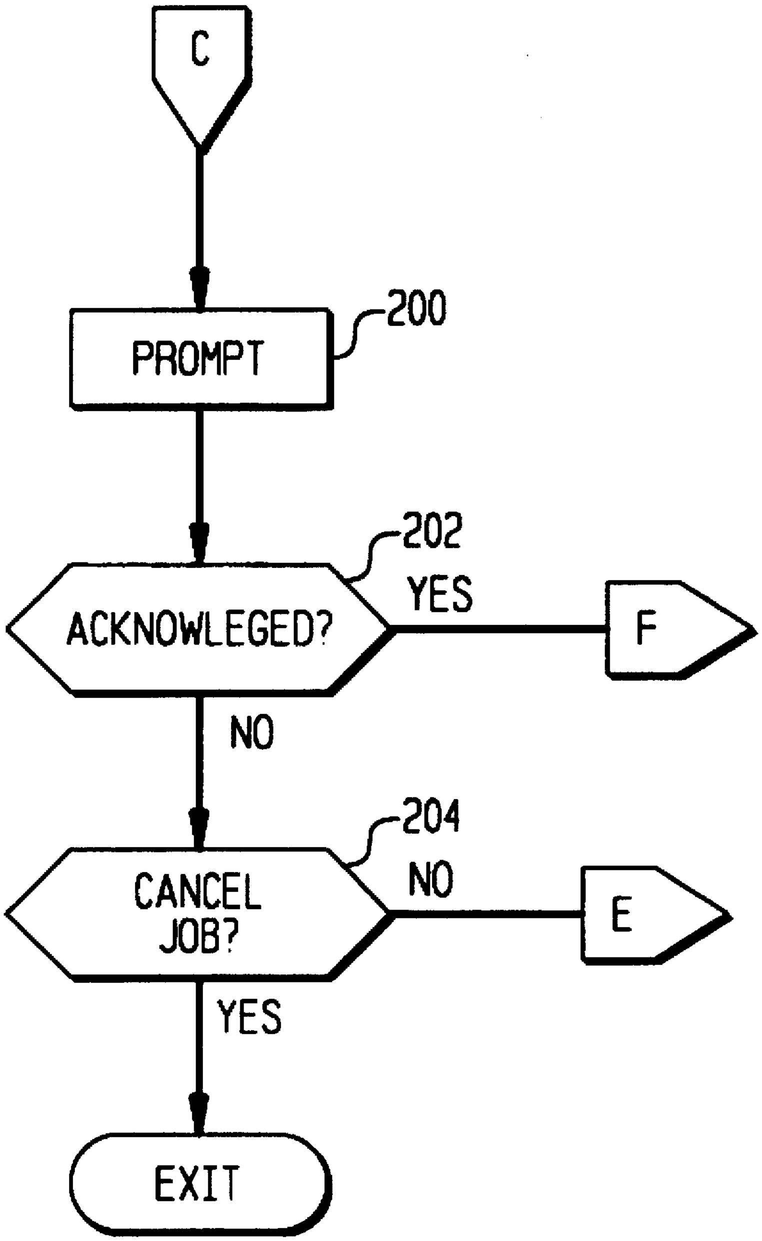

Returning to 170 in FIG. 6*a*, if the necessary materials are not loaded in the next available unit of apparatus 8, controller 4 goes to C in FIG. 6*d*. There at 200 the operator is prompted to load the correct and 202 tests to determine if the prompt has been acknowledged. (Note that actual loading of the materials may have to wait until a previous job has s finished.) If the prompt is acknowledged controller 4 goes to F at 172 in FIG. 6*a*. If not, at 204 controller 4 tests to determine if the job is to be canceled and at 204 returns to E at 162 in FIG. 6*a* to test the next available unit of apparatus 8 if the job is not canceled, and otherwise exits to an appropriate cancellation routine.

Figure 7:
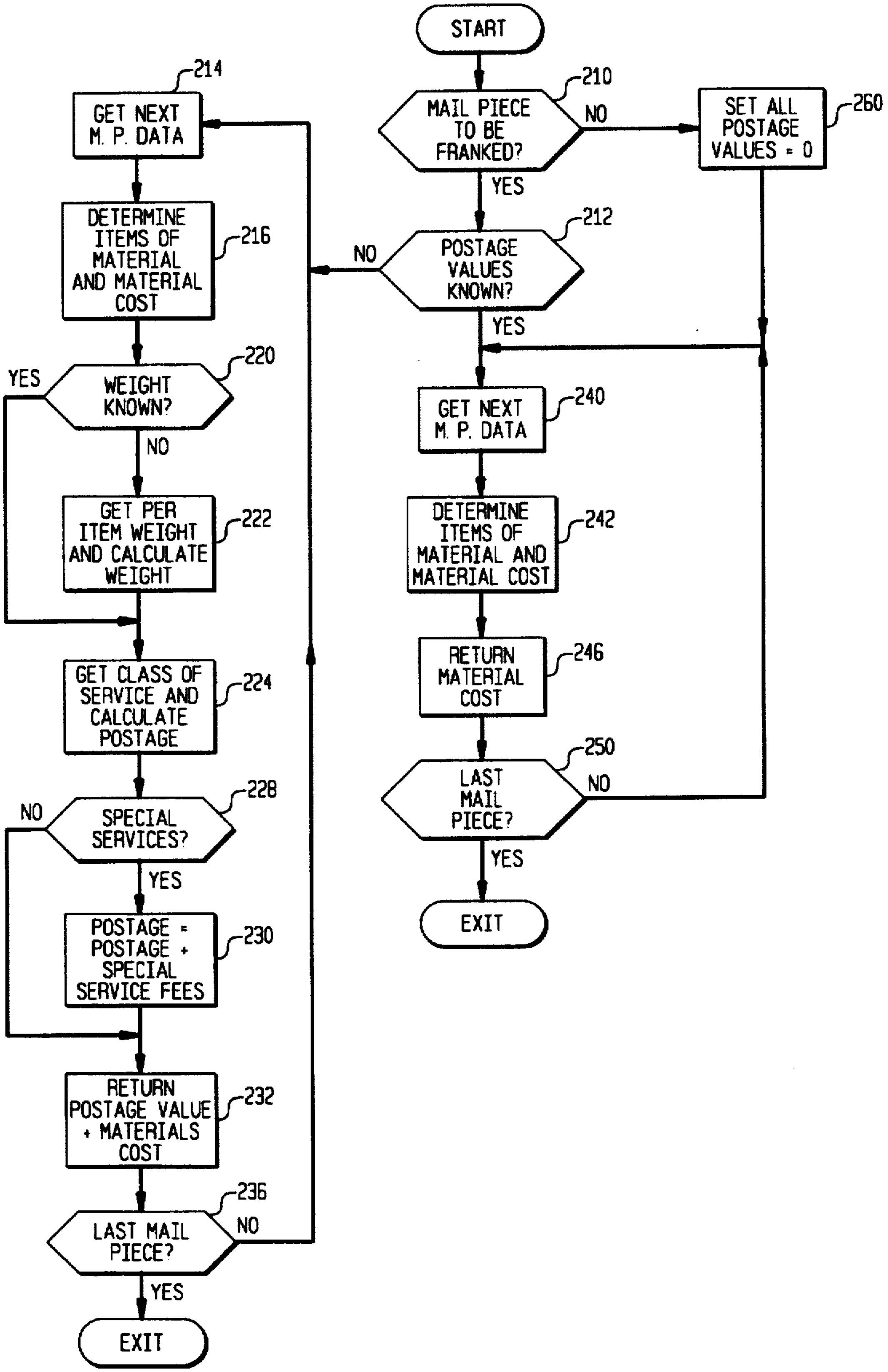
FIG. 7 is a more detailed flow diagram of the operation of the mail center controller in determining postage.

FIG. 7 shows a more detailed flow diagram of the operation of mail center controller 4 in calculating mail piece costs. At 210 controller 4 determines if mail pieces in the job are to be franked. If they are, then at 212 controller 4 determines if postage values are known a priori. If postage values are not known, then at 214 mail piece data for the next mail piece is accessed and, at 216 the items of material required and material costs are determined.

At 220 controller 4 determines if the weight of the mail piece has been determined a priori. If the weight has been previously defined as part of the mail piece attributes, then controller 6 goes to 224 to determine the class of service defined in the attributes and calculate postage for the mail piece.

If no weight is defined for the mail piece, at 222 controller 4 determines the number of sheets in the document and other items of material included in the mail piece from the attribute data, accesses data store 6 to get per item weights from data base 45 and totals the per item weights for all items in the mail piece to calculate the weight, and goes to 224.

At 224 controller 4 determines the class of service defined in the mail piece attributes and accesses data base 44 in data store 6 to get postage rate data and calculate postage for the mail piece. Then at 228 controller 4 tests the attribute data to determine if there are any special fees applicable to the mail piece. (e.g. certified mail) If there are no special fees controller 4 goes to 232.

If special fees apply the at 230 the fees are determined from data base 44 and added to the postage.

Calculation of postage from the weight and class of service and the any special services applicable is well known and need not be described further here for an understanding of the subject invention.

In other embodiments of the subject invention other characteristics such as size or width (hereinafter "rating characteristics") can be the basis for postal rates and can be used in place of, or selected as alternatives to, weight.

Implementation of such alternatives would be routine for a person skilled in the art and need not be described further here for an understanding of the subject invention.

At 232 controller 4 returns the postage value to be used to frank the mail piece and material costs for the mail piece. Then at 236 controller 4 determines if this is the last mail piece. If not, mail piece data for the next mail piece is accessed at 214 or, if costs have been calculated for the last mail piece, controller 4 exits to 156 in FIG. 6*a*.

Returning to 212, if postage values are known, then controller 4 goes to 240 to access mail piece data for the next mail piece and, at 242, determines the items of material required and the material costs for the mail piece and, at 246 returns the material costs for the mail piece. Then, at 250, controller 4 exits to 156 in FIG. 6*a* if the last mail piece has been processed. If not, mail piece data for the next mail piece is accessed at 240.

Returning to 210, if postage values are known then at 260 the postage values are set to zero and controller 4 goes to 240 to determine material costs.

The above description of preferred embodiments of the subject invention has been given by way of illustration only, and numerous other embodiments of the subject invention will be apparent to those skilled in the art from consideration of the above description and the attached drawings. Particularly, other forms of mail finishing apparatus such as that described in above referenced U.S. Pat. No. 5,067,305 are within the contemplation of the subject invention. Accordingly limitations on the scope of the subject invention are to found only in the claims set forth below.

What is claimed is:

1. A system for producing mail pieces of selected types, said system comprising:

a) a plurality of simultaneously operational apparatus, at least some of said apparatus having a variable capacity to produce particular types of mail piece each of said apparatus comprising:

a1) a first printer for printing a document;

a2) mail finishing means for receiving said document from said printer and combining said document with an envelope to form a mail piece, said mail finishing means including means for franking said mail piece;

a3) control means responsive to a signal representative of mail piece data for controlling said apparatus to produce said mail piece in accordance with said mail piece data, said mail piece data including document data defining said document; wherein said control means is further for controlling said franking means, and b) a mail center controller for receiving said mail piece data, selecting one of said apparatus having a capability to produce a particular type of mail piece defined by said mail piece data and outputting said signal to said selected apparatus.

2. A system as described in claim 1 wherein said mail center controller further comprises means for allocating costs including said postage amount to an account selected in accordance with said mail piece data.

3. A system as described in claim 2 wherein said cost further includes a cost for materials comprised in said mail piece.

4. A system as described in claim 1 wherein said mail center controller includes a data store for storing:

a) a first data base of per item rating characteristic for sheets and other materials to be used to form said mail piece; and, b) a second data base of postage rates; and wherein further, c) said mail center controller is responsive to said mail piece data to determine the number of sheets in said document and the number of other items of materials in said mail piece and then to calculate a weight for said mail piece as a function of said per item rating characteristic and to calculate a postage amount for said mail piece as a function of said weight and said postage rates, and to append said postage amount to said mail piece data prior to outputting said digital signal.

5. A system as described in claim 4 wherein said mail center controller further comprises means for allocating costs including said postage amount to an account selected in accordance with said mail piece data.

6. A system as described in claim 5 wherein said cost further includes a cost for materials comprised in said mail piece.

7. An apparatus as described in claim 1 wherein said mail finishing means includes a second printer for printing an address on said envelope.

8. An apparatus as described in claim 7 wherein said franking means comprises said second printer.

9. An apparatus as described in claim 7 wherein said second printer prints said postage amount on said envelope as a scannable representation.

10. A system for producing mail pieces of selected types, said system comprising:

a) a plurality of simultaneously operational apparatus, at least some of said apparatus having a variable capacity to produce particular types of mail pieces, each of said apparatus comprising:

a1) a first pointer for printing a document;

a2) mail finishing means for receiving said document from said printer and combining said document with an envelope to form a mail piece, said mail finishing means including means for franking said mail piece;

a3) control means responsive to a signal representative of mail piece data for controlling said apparatus to produce said mail piece in accordance with said mail piece data, said mail piece data including document data defining said document; wherein said control means is further for controlling said franking means, and b) a mail center controller for receiving said mail piece data, selecting one of said apparatus having a capability to produce a particular type of mail piece defined by said mail piece data and outputting said signal to said selected apparatus; and, c) data processing means for:

c1) generating document data descriptive of a document in said mail piece;

c2) appending attribute data to said document data to form said mail piece data; and, c3) transmitting said mail piece data to said mail center controller.

11. A system as described in claim 10 wherein said mail center controller further comprises means for allocating costs including said postage amount to an account selected in accordance with said mail piece data.

12. A system as described in claim 11 wherein said cost further includes a cost for materials comprised in said mail piece.

13. A system as described in claim 10 wherein said mail center controller includes a data store for storing:

a) a first data base of per item rating characteristic for sheets and other materials to be used to form said mail piece; and, b) a second data base of postage rates; and wherein further, c) said mail center controller is responsive to said mail piece data to determine the number of sheets in said document and the number of other items of materials in said mail piece and then to calculate a weight for said mail piece as a function of said per item rating characteristic and to calculate a postage amount for said mail piece as a function of said weight and said postage rates, and to append said postage amount to said mail piece data prior to outputting said digital signal.

14. A system as described in claim 11 wherein said mail center controller further comprises means for allocating costs including said postage amount to an account selected in accordance with said mail piece data.

15. A system as described in claim 14 wherein said cost further includes a cost for materials comprised in said mail piece.

16. A system as described in claim 10 wherein said mail finishing means includes a second printer for printing an address on said envelope.

17. A system as described in claim 16 wherein said franking means comprises said second printer.

18. A system as described in claim 17 wherein said second printer prints said postage amount on said envelope as a scannable representation.

* * * * *